(12) United States Patent
Fanourgiakis et al.

(10) Patent No.: US 12,067,511 B2
(45) Date of Patent: *Aug. 20, 2024

(54) ARRANGING A STORE IN ACCORDANCE WITH DATA ANALYTICS

(71) Applicant: Techni, LLC, Foster City, CA (US)

(72) Inventors: George Dimitrios Fanourgiakis, Foster City, CA (US); Manolis Dimitrios Fanourgiakis, Foster City, CA (US); Dylan Tatz, San Francisco, CA (US); Leo Smirnov, San Francisco, CA (US)

(73) Assignee: Techni, LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,240

(22) Filed: Jan. 6, 2023

(65) Prior Publication Data

US 2023/0162112 A1  May 25, 2023

Related U.S. Application Data

(63) Continuation of application No. 16/811,983, filed on Mar. 6, 2020, now Pat. No. 11,574,267, which is a continuation of application No. 14/883,263, filed on Oct. 14, 2015, now Pat. No. 10,586,191.

(60) Provisional application No. 62/063,903, filed on Oct. 14, 2014.

(51) Int. Cl.
*G06Q 10/0631* (2023.01)
*G06Q 10/0637* (2023.01)
*G06Q 30/0201* (2023.01)
*G06Q 30/0242* (2023.01)

(52) U.S. Cl.
CPC .... *G06Q 10/06313* (2013.01); *G06Q 10/0637* (2013.01); *G06Q 30/0201* (2013.01); *G06Q 30/0242* (2013.01); *G06Q 30/0246* (2013.01)

(58) Field of Classification Search
CPC ............. G06Q 10/063; G06Q 10/0631; G06Q 10/06313; G06Q 10/0637; G06Q 30/0201; G06Q 30/0242; G06Q 30/0241; G06Q 30/0246
See application file for complete search history.

(56) References Cited

U.S. PATENT DOCUMENTS

| | | | | |
|---|---|---|---|---|
| 2002/0161651 A1* | 10/2002 | Godsey | ................... | G06Q 30/06 340/568.1 |
| 2005/0177423 A1* | 8/2005 | Swanson, Sr. | ...... | G06Q 30/0207 705/14.1 |
| 2006/0010027 A1* | 1/2006 | Redman | ................. | G06Q 30/02 705/7.29 |
| 2012/0241395 A1* | 9/2012 | Brucia | ................... | A47B 91/06 16/24 |

(Continued)

OTHER PUBLICATIONS

Van Nierop, E., Fok, D., & Franses, P. H. (2008). Interaction between shelf layout and marketing effectiveness and its impact on optimizing shelf arrangements. Marketing Science, 27(6), 1065-1082,1133, 1136. (Year: 2008).*

*Primary Examiner* — William S Brockington, III
(74) *Attorney, Agent, or Firm* — Kramer Levin Naftalis & Frankel LLP

(57) ABSTRACT

A system can access data about items for a store and generate a plan for configuring the store based on the accessed data. The system can further provide, for example, information for configuring reconfigurable shelving units so as to produce the layout of the store according to the plan.

20 Claims, 5 Drawing Sheets

(56) References Cited

U.S. PATENT DOCUMENTS

| | | | | |
|---|---|---|---|---|
| 2013/0193098 A1* | 8/2013 | Fanourgiakis | ........ | A47F 5/0018 |
| | | | | 211/134 |
| 2014/0052555 A1* | 2/2014 | MacIntosh | ............ | G06V 20/10 |
| | | | | 705/23 |
| 2014/0348384 A1* | 11/2014 | Kolehmainen | .... | G06Q 10/0833 |
| | | | | 382/103 |

* cited by examiner

ARRANGING A STORE IN ACCORDANCE WITH DATA ANALYTICS

CROSS-REFERENCES TO RELATED APPLICATIONS

This application is a continuation of U.S. patent application Ser. No. 14/883,263, filed Oct. 14, 2015, which application claims the benefit of U.S. Provisional Application No. 62/063,902, filed Oct. 14, 2014, the entire contents of which are hereby incorporated by reference in their entirety.

BACKGROUND

Retail stores are increasingly forced to compete with e-commerce, such as Internet vending sites. For example, whereas an Internet vending site can almost instantaneously alter the way in which products are presented to shoppers by changing the appearance of a webpage or navigational path of a website, a physical retail store is constrained by the physical structures in the store. Physically moving product from one position to another in order to change an experience for a customer encountering that product in the store can involve significant time and labor costs. These and other factors can put a physical retail store at a severe disadvantage when competing with e-commerce.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments herein are directed to systems of arranging stores in accordance with, or in response to, acquired data and/or data analytics. For example, a system may include configurable shelving that facilitates rapid changes to a layout of a store. The system can include a variety of data sources and/or analytic models of processing data. For example, the system can include mechanisms or devices to provide data about conditions of the store (such as the physical location of objects in the store), and/or may include sources of data about conditions apart from the store (such as conditions of a local or broader community available through a medium such as the Internet). The arrangement of the store can be determined or varied based on these sources of data, such as by modifying a layout of the configurable shelving, adjusting levels of product offerings, altering advertising for products, or changing a location of products.

For a fuller understanding of the nature and advantages of the present invention, reference should be made to the ensuing detailed description and accompanying drawings.

BRIEF DESCRIPTION OF THE DRAWINGS

These and other features, embodiments, and advantages of the present disclosure are better understood when the following Detailed Description is read with reference to the accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
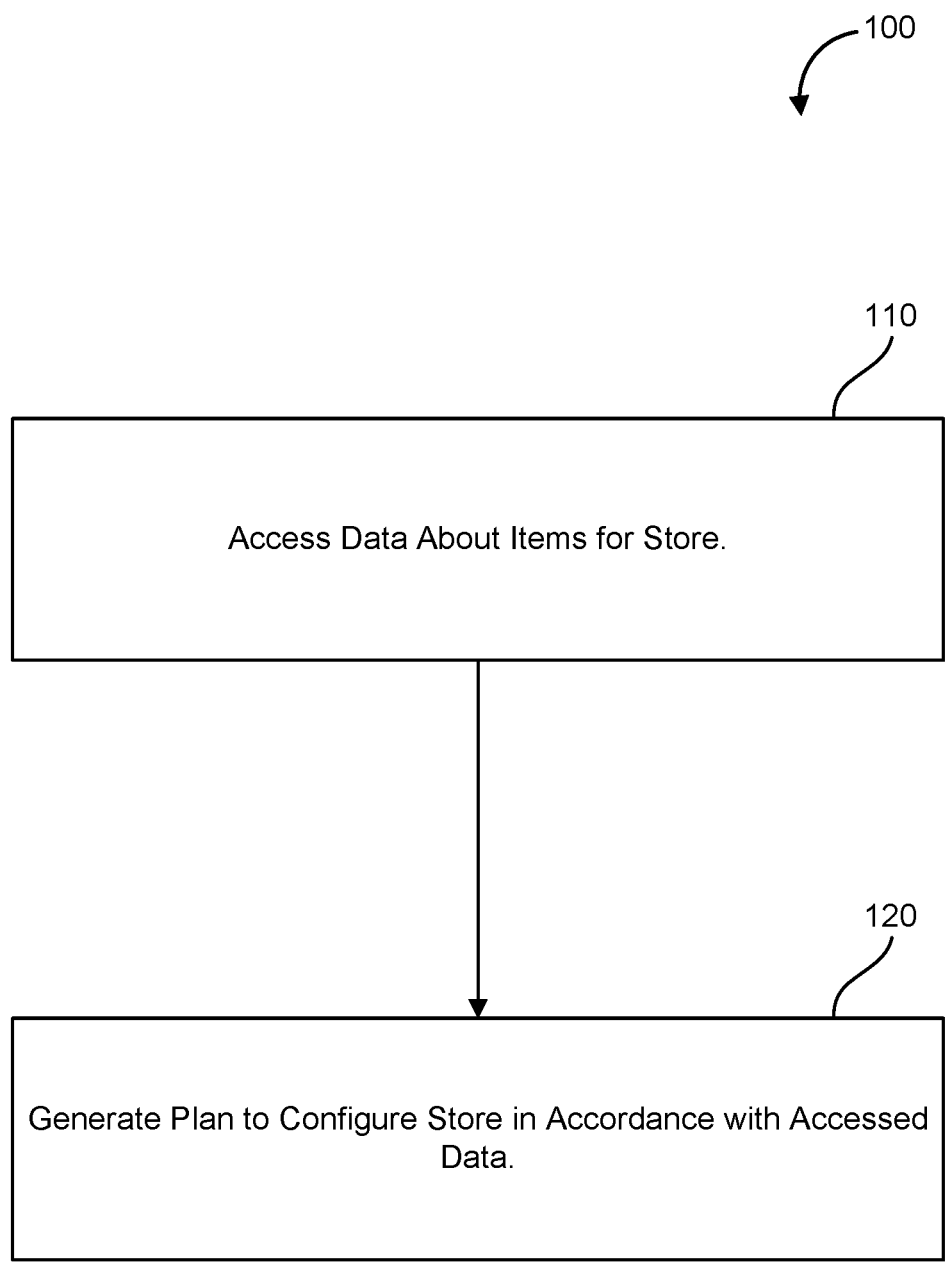
FIG. 1 is a flow chart representing a process of configuring a store in accordance with various embodiments.

Referring now to the drawings, in which like reference numerals represent like parts throughout the several views, FIG. 1 is flow chart representing a process 100 of configuring a store in accordance with various embodiments. As used herein, a "store" or "retail store" refers to any establishment where goods and/or services are advertised and/or sold. Examples of types and/or locations of stores include, but are not limited to, grocery stores, drugstores, department stores, clothing stores, outlets, malls, restaurants, airports, theaters, and hotels. At 110, a computer system (e.g., the computer system 200 described below with respect to FIG. 2) can access data about items for a store (hereinafter "store item data"). In some aspects, the store item data may relate to a current or prospective product for the store, such as for sale, consumption, or other use during operation of the store. For example, the store item data may include information about a popularity or consumer demand for a product and/or a current or prospective location of the product within the store. In some aspects, the store item data additionally or alternatively may relate to infrastructural objects for the store, such as shelving units, displays, shopping carts, point-of-sale terminals, or other objects that can facilitate a shopping experience or purchase of a product. For example, the store item data may include information about manners in which persons (such as customers or prospective customers) interact with—or move with respect to—such infrastructural objects. Several further examples of store item data are provided below, some of which illustrate that the store item data may include information about conditions at a store and/or conditions apart from a store. In various examples, the store item data is reflective of human behavior associated with items for the store.

At 120, a plan is generated to configure or change the store in accordance with the store item data accessed at 110. In embodiments, the computer system generates a plan for the configuration of the store (hereinafter "store configuration data") based upon the accessed store item data. The plan or store configuration data can be utilized to generate information or instructions provided at 120. Several examples of such instructions are provided below, following the description of FIG. 2.

Figure 2:
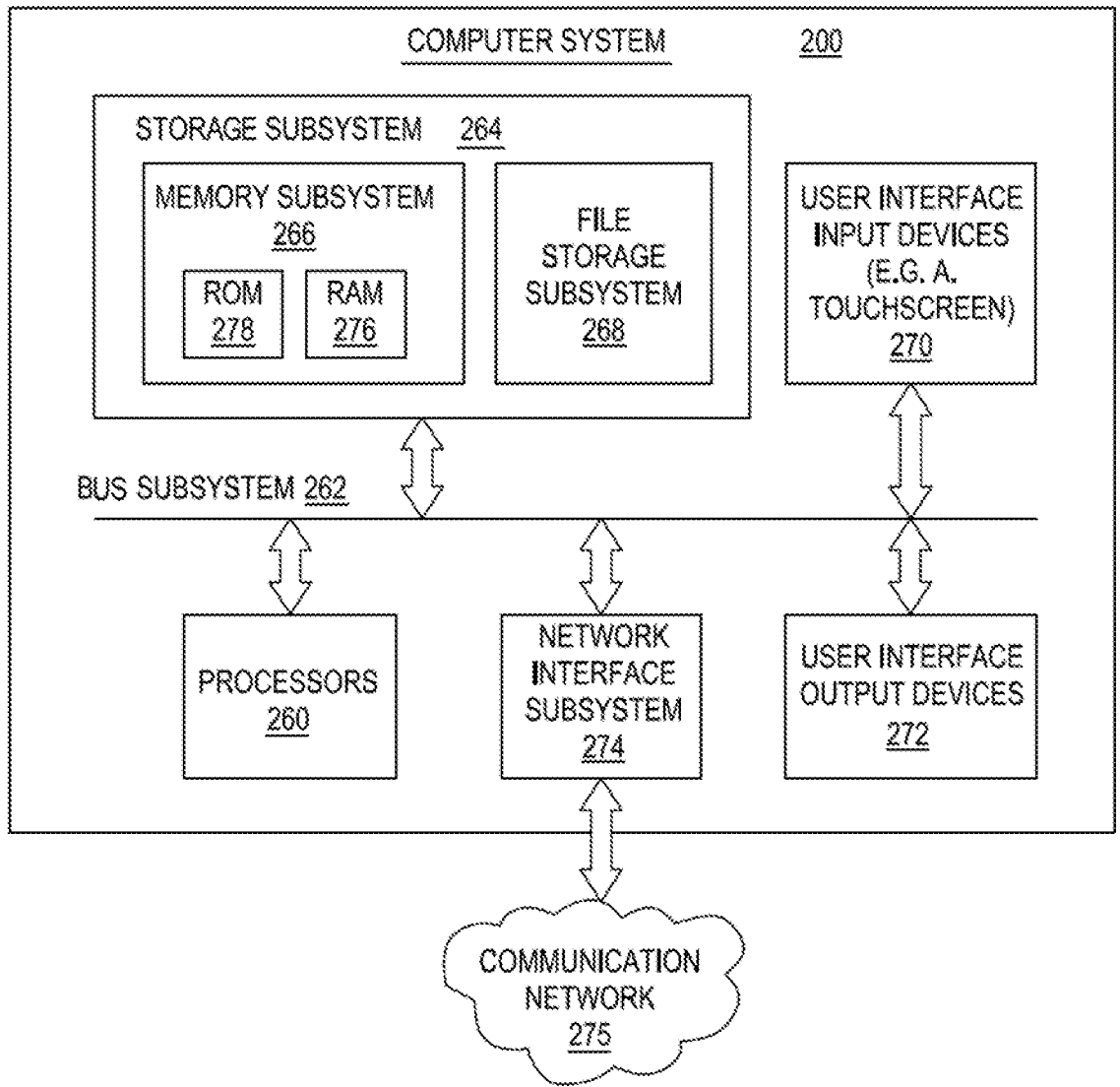
FIG. 2 is a simplified block diagram of an exemplary computer system that can be used in accordance with embodiments described herein.

FIG. 2 is a simplified block diagram of an exemplary computer system 200 that can be used in accordance with embodiments described herein. The computer system 200 typically includes at least one processor 260 which communicates with a number of peripheral devices via a bus subsystem 262. These peripheral devices may include a storage subsystem 264, comprising a memory subsystem 266 and a file storage subsystem 268, user interface input devices 270, user interface output devices 272, and a network interface subsystem 274. Network interface subsystem 274 provides an interface to a communication network 275 for communication with other systems, computers, databases, or the like.

The processor 260 performs the operation of the computer systems 200 using execution instructions stored in the memory subsystem 266 in conjunction with any data input from an operator. Such data can, for example, be input through user interface input devices 270, such as the graphical user interface. Thus, processor 260 can include an execution area into which execution instructions are loaded from memory. These execution instructions will then cause processor 260 to send commands to the computer system 200, which in turn control the operation of the container control electronics. Although described as a "processor" in this disclosure and throughout the claims, the functions of the processor may be performed by multiple processors in one computer system or distributed over several computers.

User interface input devices 270 may include a keyboard, pointing devices such as a mouse, trackball, touch pad, or graphics tablet, a scanner, foot pedals, a joystick, a touchscreen incorporated into the display, audio input devices such as voice recognition systems, microphones, and other types of input devices. In general, use of the term "input device" is intended to include a variety of conventional and proprietary devices and ways to input information into the computer system. Such input devices will often be used to download a computer system executable code from a computer system network or a tangible storage media embodying steps or programming instructions for any of the methods of the present invention.

User interface output devices 272 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include a variety of conventional and proprietary devices and ways to output information from the computer system to a user.

Storage subsystem 264 stores the basic programming and data constructs that provide the functionality of the various embodiments. For example, database and modules implementing the functionality of embodiments described herein may be stored in storage subsystem 264. These software modules are generally executed by processor 260. In a distributed environment, the software modules may be stored in a memory of a plurality of computer systems and executed by processors of the plurality of computer systems. Storage subsystem 264 typically comprises memory subsystem 266 and file storage subsystem 268.

Memory subsystem 266 typically includes a number of memories including a main random access memory (RAM) 276 for storage of instructions and data during program execution and a read only memory (ROM) 278 in which fixed instructions are stored. File storage subsystem 268 provides persistent (non-volatile) storage for program and data files, and may include a hard disk drive, re-writable non-volatile memory chips (such as Flash memory), a floppy disk drive along with associated removable media, a Compact Digital Read Only Memory (CD-ROM) drive, an optical drive, DVD, CD-R, CD-RW, or removable media cartridges or disks. One or more of the drives may be located at remote locations on other connected computers at other sites coupled to the computer system. The databases and modules implementing the functionality of the present invention may also be stored by file storage subsystem 268. The file storage subsystem may have directory and file descriptions for accessing the files, or it may store data without descriptions and rely on the databases and modules of the system to locate the data.

Bus subsystem 262 provides a mechanism for letting the various components and subsystems of the computer system communicate with each other as intended. The various subsystems and components of the computer system need not be at the same physical location but may be distributed at various locations within a distributed network. Although bus subsystem 262 is shown schematically as a single bus, alternate embodiments of the bus subsystem may utilize multiple busses.

The computer system 200 itself can be of varying types including a personal computer, a portable computer, a workstation, a computer system terminal, a network computer, a module in a circuit board, a mainframe, or any other data processing system. Due to the ever-changing nature of computers and networks, the description of the computer system depicted in FIG. 2 is intended only as a specific example for purposes of illustrating one embodiment. Many other configurations of the computer system are possible having more or less components than the computer system depicted in FIG. 2.

Referring again to FIG. 1, in one example, at 120, the computer system can display store configuration data so that a human operator can utilize that information to decide how to configure the store. Displaying store configuration data for a human operator can include displaying information in a report format. For example, the computer system may provide a user interface by which a user can request and/or view reports. The reports may be generated automatically or in response to requests from the user. Displaying store configuration data for a human operator can also include providing a visualization of present and/or possible arrangements of the store. For example, a "visualizer" of the store may incorporate a virtual representation of the store that may show the configuration and/or layout of physical elements of the store. The virtual representation can show shelving, other fixtures, and/or products and indicate positioning and/or other information. The visualizer may be provided, for example, by the computer system 200 described above with respect to FIG. 2, and/or by the computer system 300 described below with respect to FIG. 3.

The visualizer or other store configuration data may be updated to reflect changes in store item data. The store configuration data and/or the store item data may be updated at any suitable time interval (including continuously, e.g., "real-time"). Frequent updating may provide timely access to information that can allow changes to be made much more quickly than in conventional retail stores lacking systems described herein.

The computer system may be configured to provide store configuration data to several different types of users, either individually or in combination. For example, human operators that may wish to access store configuration data through the computer system may include a corporate director of a chain of stores, a store owner, a local store manager, a product supplier, product delivery personnel, product manufacturing personnel, product sales personnel, consumers, or anyone else associated with a store or a distribution chain for a product. As a specific example, a product supplier or promoter of Consumer Packaged Goods (CPG), may wish to have ready and immediate access available to store configuration data in order to determine how best to spend available funds for promoting his or her product or products in a given store.

In some aspects, at 120, the store configuration data supplied by the computer system may supplement a human operator's decisions for configuring the store. In one example, the store configuration data provided by the computer system may include suggestions for configuring the store based on the store item data accessed at 110. In another example, the store configuration data provided by the computer system may send instructions for moving product and/or fixtures to change a layout of a store based on the store item data accessed at 110. To this end, the computer system may provide instructions to human operators regarding a manner in which product and/or fixtures are to be moved. Alternatively or additionally, the computer system may send instructions to devices to automatically move the fixtures and/or product within the store so as to change the layout in response to the store configuration data. In some embodiments, the computer system may communicate with a printer, such as to provide information for printing advertising for use by or in the store. The computer system may communicate with the printer automatically and/or in response to a request from a human operator. In some embodiments, the computer system may communicate with one or more digital displays in the store, for example to update advertising displayed on the displays in response to store item data accessed at 110, such as in response to detecting the proximity of a user having a shopping history indicative of a disposition for buying a particular item in the store.

The store may include fixtures that facilitate rapid and/or convenient configuration of a store. For example, the store may include components disclosed in U.S. patent application Ser. No. 14/341,675, filed Jan. 26, 2012, entitled "Variable Planform Shelving System," (hereinafter the '675 application, Appendix A, attached), and/or any components or layouts described and disclosed in U.S. patent application Ser. No. 14/475,243, filed Sep. 2, 2014, entitled "Center Store Arrangement for Retail Markets," (hereinafter the '243 application, Appendix B, attached), the entire disclosures of which are herein incorporated by reference. Such components may facilitate configuring a store in accordance with store configuration data. For example, such components may include reconfigurable shelving units having components configured for re-arranging relative to one another so as to change the shelving unit between different configurations. This may permit the shelving units to be readily reconfigured in response to store item data accessed at 110, such as to produce the layout of the store according to the plan or store configuration data generated at 120. In some examples, the reconfigurable shelving units may include multiple frames or other structures that are adjustable relative to one another (e.g., by sliding, pivoting, and/or de-coupling and recoupling) to adjust a length, a curvature, a shape, a footprint, and/or a planform of the shelving unit or a display in the store. Reconfigurable shelving units may be reconfigurable as a result of including components that are configured to be coupled together in a first arrangement to provide a first footprint of the reconfigurable shelving unit (e.g., with a first length and a first curvature) and also configured to be coupled together in other arrangements (e.g., a second arrangement) to provide other footprints that differ from the first footprint (e.g., a second footprint having a second, different length and/or a second, different curvature). In various aspects, a store may include a plurality of items that are in the store and at least partially contained by a reconfigurable shelving unit, multiple reconfigurable shelving units, and/or other forms of shelving or product display systems.

Store item data accessed at 110 can originate from a variety of sources or combinations thereof. In various aspects, the data can include information about conditions of a store or in the store. Several illustrative examples of possible sources and uses for data about conditions of a store follow.

In a first example, the store may include one or more cameras. Cameras can be used to track a flow of the store, such as movement of persons within the store. A camera may provide store item data about how long persons stop with respect to any given product or fixture (e.g., "loiter time"), or how many people travel past a given product or fixture within a particular time range (e.g., "foot traffic"). Cameras may additionally or alternatively be used in conjunction with facial recognition algorithms, such as to identify emotional responses to items or layouts, or to identify gender, age, or other relevant information that may be useful in determining demographics of customers in a store. The cameras may additionally or alternatively provide information about how persons navigate through different layouts, such as if they avoid certain fixtures or gravitate toward others. Such information can be used to update a store visualizer and/or provide recommendations as to what layouts are effective or ineffective. In some embodiments, a camera in a parking lot may provide store item data about types of cars in the parking lot. For example, an automotive parts store may use such data from stores within a geographic area to determine types of parts to stock in inventory.

In another example, shelves or other fixtures of the store can include tracking components that may provide positioning data that forms part of the store item data accessed at 110. For example, individual shelves may include RFID (radio-frequency identification) tags or other similar technologies (such as Bluetooth receivers, near field communication, WiFi communication, or other wireless or wired communication devices capable of indicating a proximity or position of a sensor) to indicate the position of particular shelves within the store, which may indicate an overall layout of shelving units in the store. In some aspects, such communication devices may indicate what products are on the shelves and/or conditions of the products. For example, the shelves can include detectors for detecting tags of products located on the shelves. In an illustrative example, a sensor in a carafe for milk in a coffee shop can be detected by a shelf to communicate the temperature of the milk and/or an amount of milk in the carafe, such as may be useful in determining if the milk needs to be refilled and/or replaced. In another example, a tag of an item may be detected to access an expiration date stored for that item, such as may be useful in prompting a change in display, price, advertising, placement, etc. of the item to increase a likelihood of purchase before the expiration date or in prompting removal of the item, e.g., if within a certain threshold of the expiration date. Tracking components can also be used with temporary fixtures, such as wet floor signs, other safety devices, shopping carts, and/or hand baskets. For example, tracking any of these objects may permit the objects to appear in the store visualizer along with other components and/or be included when configuring the store in response to store configuration data. Other forms of tracking can also be used, including, but not limited to, tracking provided via cameras or other optical imaging devices.

Tracking components may permit or facilitate additional gathering of data, such as indicating movement of people, fixtures, or products with respect to the store. For example, such components may provide information about products in a particular shopping cart or basket, such as may be useful for determining trends in how items are collected or purchased together or for providing relevant advertisement based on other items in a shopper's cart or basket. In some embodiments, tracking components may facilitate measures for preventing or reducing shoplifting. For example, if a product is detected as removed from a shelf (e.g., from weight sensors on the shelf registering a decrease in weight corresponding to removal of the item, or from a tag in the item no longer being detected as present at the shelf), and if the item is not detected in a basket or cart or at a point of sale for a particular amount of time, the item may be flagged (e.g., as misplaced or stolen) or tracked separately. In some cases, this may provide a prompt to store personnel, such as instructions to locate the item and determine if it is merely being carried by hand toward checkout or being concealed in an attempt to shoplift.

In a further example, the computer system may have access to information about placement of price tags. Information about placement of price tags in some cases can be used as a proxy for items corresponding to the price tags. As an illustrative example, if a price tag is placed centrally or at another known relationship to corresponding items, information gathered about the location of the price tag can be extrapolated to identify the location of the corresponding items within the store. This may provide an alternative approach to estimating or determining a location of items in the store (such as for a visualizer) in scenarios in which less than all of the items include individual tracking components such as RFID tags. In some aspects, location of price tags can be altered based on a plan or store configuration data generated at 120, such as by providing instructions to physically move price tags in conformity with the plan, or by prompting changes in digital displays, such as may be capable of displaying price tags at different locations along a length of the display.

In yet another example, the computer system may have access to point-of-sale information as part of the store item data accessed at 110. For example, the registers in a store may be linked with the computer system so that sales data can be aggregated in a central repository for analysis. In some scenarios, the sales data can be used, along with other data described herein, to determine how quickly product is being sold with respect to a particular layout or other factors at work at the store or separate from the store. Another use of sales data may be to determine the zip code or other relevant regional areas associated with shoppers of the store, such as to determine parameters for refining a scope of store item data accessed at 110 about conditions distinct from the store.

Other types of sensors may also be used to provide store item data, such as may be used at 110. For example, a store may include proximity sensors, weight sensors, seismic sensors, and other types of sensors. In an illustrative example, a sensor may detect heart rates of persons near a product display, e.g., providing information for comparing emotional responses of persons to different layouts or configurations.

Store item data accessed at 110 can also include information about conditions distinct from the store. Such conditions may affect a likelihood of a person purchasing a specific item or type of item. Such external conditions may be determinable by access to the Internet or other network of computers. Sources about external conditions can relate to local, national, international or any other geographic region, including zip code. Sources about external conditions can include tax data (such as income tax data, property tax data, or sales tax data), housing data, locale trend data, sports data, seasonal data, event data, government holiday data, religious holiday data, data about ages living in an area, medical data, income data, stock market data, credit card data, police data, fire data, crime data, disaster data, birthday data, weather data, environmental data, U.S. Census data (or census data from another government or source), demographic data, locale design data, trending data, school data, real estate data, traffic data, social media data, food trends data, and/or product trends data. In the following, a number of illustrative examples are provided regarding how such sources may be utilized; however, many other ultimate uses or effects of such data are possible within the scope of this disclosure beyond the specific examples provided herein.

As a first illustrative example, local trend data (e.g., accessed at 110 as store item data) may reflect publically available information from a ratings organization about local coffee shops in the community where a store is located. In response to this data, the computer system may provide, for example, a recommendation to the store to begin offering coffee from a shop that has recently opened nearby with great reviews. As other examples, the computer system may provide a recommendation to the store to increase the prominence of a display of a coffee from a shop that has recently surged in popularity, or to decrease an inventory of a coffee shop that has recently received a spate of negative reviews. In a related example, a store may poll search engine analytics about coffee shops, such as how many people are requesting driving directions to coffee shops, comments about the shops on review sites, and/or hits on the shops' websites from Internet users within a certain geographic proximity. Such metrics may be used to determine conditions related to other shops in the vicinity of the store to base decisions about products or layouts on those conditions. Access to real-time analytics may allow a store to rapidly reconfigure to capitalize on real-time trends.

As another illustrative example, seasonal information, holidays, or community events on local, national, international, and/or other scales may be accessed as store item data at 110 and analyzed to prioritize product placement within the store or prepare for variations in the traffic through the store due to the special occasions. As a specific example, in response to local event information that a championship high school baseball game is occurring on Saturday afternoon at 2:00 p.m., the system may prompt a movement of displays of team baseball hats from a usual place within a clothing department to more prominent end caps near a front of the store. A supplier of the peanuts, that would not otherwise know about the local baseball game as an improved opportunity for selling more peanuts, may be informed of the information through this system and provided an opportunity to request better treatment of the peanuts within the layout of the local store. As another specific example, in response to seasonal information that a camping season is coming to a close due to a burn ban slated to start the following week, the system may respond to an anticipated increased interest in last-minute camping delicacies and prompt greater cross-promotion of marshmallows, chocolate, and crackers, such as by prompting placement of the items together, prompting promotional deals for joint purchase of the items, prompting a change in a shape or placement of a display for the items, or prompting other cross-promotional actions.

In a further illustrative example, data from social networks or census data can be accessed as store item data at 110 and analyzed to determine distribution of birthdays in a geographic area, which may prompt promotions and/or additional stocking of birthday-related supplies—such as party favors or birthday cakes—for spans of time with a higher incidence rate of birthdays.

In yet another illustrative example, the store item data accessed at 110 can include weather trend or forecast data. For example, a deli portion of a supermarket may receive a recommendation to prepare additional soup in anticipation of a colder day forecast for the following day. As another example, sweatshirts may be moved to a prominent location (such as a front of a store) or into another layout based on a cool weather forecast or trend. As a third example, data that the store is located in a geographic area that is currently raining may prompt wet floor signs or extra drying mats or other safety mechanisms to be deployed within the store. As a further example, a nursery may use weather data to determine a watering schedule for plants, which may be stocked in inventory based on other available store item data, such as information about what plants are locally grown or recommended based on a climate of the location of the store and/or the store's anticipated customers.

In one more illustrative example, police and fire data can be can be accessed as store item data at 110 and correlated with sales data of stores situated in areas with similar conditions to determine recommendations for layouts or products to offer in a particular store. Similarly, publicly available aggregated local income data may be used to determine prices or product offerings for a particular population. Such information may also permit and/or encourage compliance with ordinances, both local and general, regarding types of products that must be offered as a minimum for certain classes of population, such as healthy foods to low income areas.

In another illustrative example, U.S. Census data can be accessed as store item data at 110 and analyzed to determine consumption levels of products, especially when other, more reliable data is not generally available. For example, a total number of shipping containers carrying a certain product can be determined from the U.S. Census data and then, based on that data, a system at 120 may provide store configuration data that includes a recommendation to provide that product in a certain geographic area.

For another illustrative example, data from social media can be accessed as store item data at 110 and utilized to match product promotion in the store with products that are trending on the social media. As a specific example, a pet store may receive recommendations about types of dog food to sell or breeds of dogs to keep in stock based on the prevalence of either the breed of dog or the brand of dog food that is most commonly referenced in social media in the geographic area of interest, such as the city, county, state, or nation.

Store item data accessed at 110 can include data about any characteristic of an item for the store. As specific examples, the store item data accessed at 110 can include purchasing history of an item in the store, data about a purchasing history of an item at locations other than the store, data about a demand for an item, data about a popularity of an item, data about a profitability of an item, or data about revenue streams for an item (e.g., if promotional funds are attributable to the item in addition to margins that may be obtained upon sale of the item). A useful life or expiration date of an item may also be provided in store item data accessed at 110.

As described above, at 120, a plan or store configuration data can be provided to configure the store in accordance with the store item data accessed at 110. Configuring the store can take the form of providing recommendations or directions to human operators for reconfiguring the store. Reconfiguring the store can also, or alternatively, include sending commands to automated components (such as servos or actuators) and/or robots to configure the store in response to the accessed data. For example, as described above, the information for configuring the store may be provided to any party with an interest in the store.

In some aspects, the system can facilitate interaction between interested parties. For example, the system may permit workers in the store to interact with providers of a product or fixtures in order to verify the accuracy of changes made, or to make inquiries about the manner in which the requested changes are to be implemented. In another example, a product provider, such as a provider of CPG, can interact through the system with a person in control of the store layout. For example, the CPG product provider may be able to submit proposed layout changes to the way that the product is displayed in the store (e.g., different shelving arrangement, different location, different signage, or additional promotions), and the store manager can authorize or validate a price for the interaction. As an alternate example, a store manager may contact a product supplier with an offered configuration and accompanying price to determine if the product supplier wishes to spend the money of the set price to further promote the product supplier's goods.

In some embodiments, permissions may be implemented to govern interactions between users of the system. For example, a corporate director of a supermarket chain may be given full administrative permissions by the provider of the system. The corporate supervisor may then determine which features are going to be made available to others in the process such as general managers of the stores, product suppliers, product deliverers, and/or store customers. In some aspects, a permission may be provided which permits another user to give permission to another subset of users. For example, a corporate director may provide a store manager full access to all features related to the manager's store, but restrict access to details of other stores in the chain. The store manager may then grant some access to a manager of a deli portion of the store, and other access to a manager of a bakery portion of the store, as the store manager deems appropriate for each individual. In some aspects, the permissions also permit a control over what data is accessed at 110 or accessible to another user of the system. For example, a corporate director of a chain of stores may limit a particular store to being able to use weather data and local trend data while preventing the police data or fire data from being accessible to the store manager. In some aspects, the permissions can include allowing customers at the store to see in a visualizer (such as in a mobile application, a web application, a kiosk within the store, and/or some other user interface that includes one or more of the user interface input devices 270 and/or user interface output devices 272 described above with respect to FIG. 2), in real time, the condition of the store, such as the inventory that is presently on the shelf, what items are trending, or what items are suggested, based on others in that region of similar characteristics. In some aspects, the permissions may include allowing or disallowing a product supplier to see sales levels of other product suppliers in the same store.

The system may provide a number of different features in a user interface. For example, the system may provide a visualizer of the store, as discussed earlier. The visualizer may include graphic representations of the fixtures and/or products in the store as they appear in real time. The visualizer may also be utilized to indicate other attributes in addition to position, such as rate of sale, popularity, level of facilitating traffic flow, configurability, costs or revenue associated with a component (such as if a product supplier is paying extra for certain shelf space, layout, or other features), or changes in any metric of interest. For example, the visualizer may provide an indication of a percent increase in space or projected sales that a new layout would be expected to provide. The user interface may provide opportunities to provide reports about products or layouts or components within the store or overall system. The user interface may include an option to view information sorted by products. The user interface may provide access to inventory information that may be updated in real time, based on other information available from the system. The user interface also may provide access to information based on Internet data or in-store data.

The visualizer is not limited to real-time visualization. The store visualizer may also permit visualization of what products would be on the shelf for a new layout. For example, the user interface may include options to evaluate store locations for a new store, potential layouts, product planning, or safety precautions, such as by looking at and/or manipulating a potential layout in the visualizer. In an illustrative example, the user interface can display a potential layout and provide a parts list and/or cost to implement the potential layout. In some aspects, the store design can also be determined and/or modeled by the system, such as to show the overall feel of the store.

Any form of user interface may be provided. The user interface may include any specific one of—or combination of—the user interface input devices 270 and/or user interface output devices 272 described above with respect to FIG. 2. As particular examples, a user interface may be provided in the form of a mobile application, a web application, a computer program on a computer in an office of the store, or in the form of a kiosk in the store. In some aspects, the user interface may include a navigation module, such as to provide a customer, employee, or other user with directions for reaching a particular product or fixture within the store. In some aspects, a user interface may provide push notifications or other forms of information transfer to users, such as providing coupons or advertising for a product to a user's device, such as based on a proximity of the user or user's device to the product in the store, based on a past shopping history of the user, or based on trends, social media data, or other types of data.

In some aspects, a store location element can be included in the system for aggregating store item data accessed at 110 and providing a recommendation for where to locate a store to sell particular goods based on other information in the system. In some aspects, information that is about conditions separate from a store may include information about another store, i.e., information that is about objects such as products or fixtures in another store, and not the store in question. The system can use any appropriate time horizon for analyzing and/or presenting data about conditions in the store or separate from the store. As illustrative examples, the data may be presented in a manner that is reflective of the last year of available data or of the last second of available data.

Figure 3:
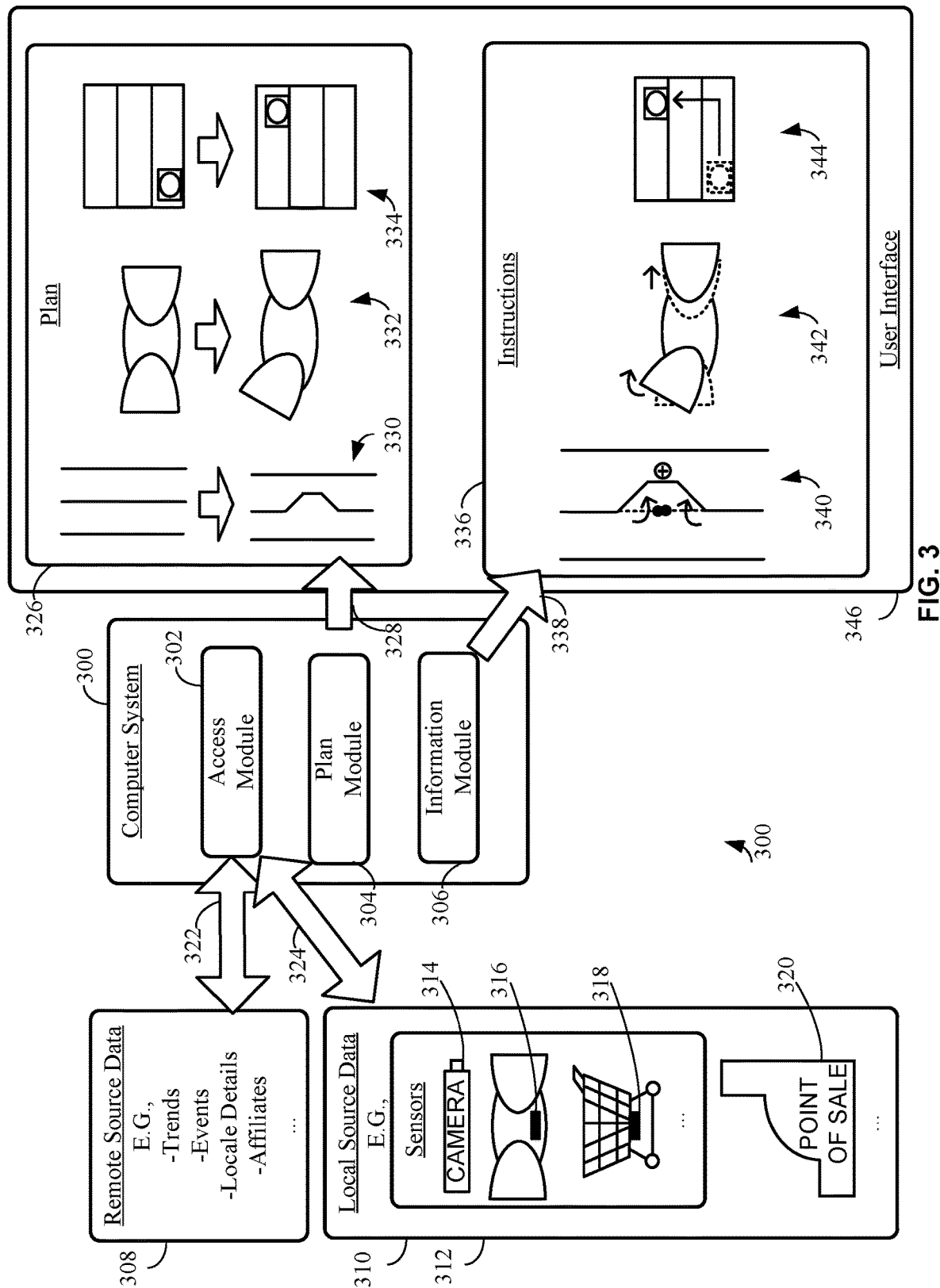
FIG. 3 is a schematic illustration showing an example system for arranging a store according to data analytics in accordance with various embodiments.

FIG. 3 is a schematic illustration showing an example system 300 for arranging a store according to data analytics in accordance with various embodiments. The illustrated system 300 includes a computer system 300. The computer system 300 can be an example of the computer system 200 described above with respect to FIG. 2. The computer system 300 is shown with an access module 302, a plan module 304, and an inform module 306. These example modules are shown in FIG. 3, but functions and embodiments described herein can utilize a subset of the features provided by the modules and/or additional functions can be provided. Additionally, some or all of the process 100 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The computer system 300 is additionally shown with a user interface 346. Although the user interface 346 is shown apart from the modules of computer system 300 for the sake of clarity, the user interface 346 can be considered part of the computer system 300. The user interface 346 in FIG. 3 is generally depicted as a screen for presenting information from the computer system 300 to a user. However, the user interface 346 may additionally or alternatively include individually or in combination any other of the user interface input devices 270 and/or user interface output devices 272 described above with respect to FIG. 2.

Turning again to the example modules shown in FIG. 3, the access module 302 can access data associated with and/or relevant to items for a store. Such data may correspond, for example, to store item data accessed at 110, such as described elsewhere herein. In FIG. 3, this data includes remote source data 308 and local source data 310 accessed by the access module 302 (e.g., as illustrated respectively by arrows 322 and 324).

The remote source data 308 can include data acquired from sources outside of or apart from the store, such as data about trends, events, locale details (such as demographic details about a locale in which the store is situated or contemplated, and/or details about a locale identified as similar or otherwise relevant to the store), affiliates (such as data from other stores in a chain, data from suppliers for the store, data of a transactional or other nature from product promotors that wish to invest funds in promoting certain products in the store, etc.), or other factors of interest. In embodiments, the remote source data 308 may be provided via the internet or other network connection.

The local source data 310 can include data acquired from sources within the store. For example, the local source data 310 may include data acquired from sensors 310 such as cameras 314, sensors 316 on reconfigurable shelving units (such as may provide data about items on the reconfigurable shelving unit and/or about a configuration in which components of the shelving unit are arranged to provide a particular footprint of the reconfigurable shelving unit), sensors 318 on shopping carts or baskets (such as may provide data about items therein or about movement of persons in the store), or other sensors described elsewhere herein. As another example, the local source data 310 may include data from point of sale equipment 320 (such as electronic or manual cash registers or other terminals), such as may be useful in determining details such as purchase history of items in the store or other trends or metrics. Although some general examples of possible types of the local source data 310 have been described, the local source data 310 may additionally or alternatively include other forms or types of data described herein.

The plan module 304 can generate (e.g., as illustrated by arrow 328) a plan 326 for configuring the store based at least in part upon the data accessed by the access module 302. As a first illustrative example, in response to data from the access module 302 indicating that a product promotor has paid to increase the prominence of a particular product, the plan module 304 may generate a plan (e.g., at 330) of introducing a new row configuration, e.g., a configuration from the '243 application that provides a layout of a row in the store with more prominent sightlines to the promoted product, shifting away from a configuration in which all the rows are parallel and provide undifferentiated sightlines. Other layouts or arrangements besides those disclosed in the '243 application may additionally or alternatively be part of the plan 326 or otherwise used by the system 300. As a second illustrative example, the plan module 304 may generate a plan (e.g., at 332) that involves a layout that calls for a change in a length and/or a change in a curvature of a reconfigurable shelving unit, such as to change an amount of space for the item and/or to change a sightline for the item. As a third illustrative example, the plan module 304 may generate a plan (e.g., at 334) to move an item to a more prominent place, such as a higher shelf in the store.

The information module 304 can provide information (e.g., as illustrated by arrow 338) for implementing the plan 326 generated by the plan module 304. In some aspects, this may include showing the plan in a visualizer, such as presenting information from the plan module 304 and/or the information module 306 via the user interface 346. In some aspects this may include the information module 304 providing (e.g., as illustrated by arrow 338) instructions 336 for implementing portions or all of the plan 326. As a first example, the instructions 336 at 340 are shown as a graphical representation that instruct a worker that an appropriate way to implement the first illustrative example of the plan 326 shown at 330 is to pivot portions of a central row toward an outer row and add an additional portion between the pivoted portions. In some aspects, the implementation may involve a reconfigurable shelving unit with a set of components that can be shifted from one arrangement in which the components are coupled together to another arrangement in which the components are coupled together to provide a different footprint (e.g., different curvature or length) of the reconfigurable shelving unit. Indeed, as a second example, the instructions 336 at 342 are shown as a graphical representation that instruct a worker to pivot a first half-elliptical frame relative to a full-ellipse frame and to slide or otherwise translate a second half-elliptical frame relative to the full-ellipse frame in order to achieve the curvature and length extension called for in the second illustrative example of the plan 326 shown at 332. Although this illustrative example is illustrated with a reconfigurable shelving unit that is an example from the '675 application, other reconfigurable shelving units may additionally or alternatively be utilized by the system 300. As a third example, the instructions 336 at 344 are shown as a graphical representation that instruct a worker to implement the third illustrative example of the plan 326 shown at 334 by moving an item from an initial position on a bottom shelf to a revised position on a top shelf. Furthermore, although the examples of the instructions are shown in FIG. 3 primarily as graphical representations showing operations that can be performed to implement a plan 326, the information module 306 may provide information for implementing the plan 326 in other ways, including, but not limited to providing instructions to automated components that cause implementation of the plan.

Figure 4:
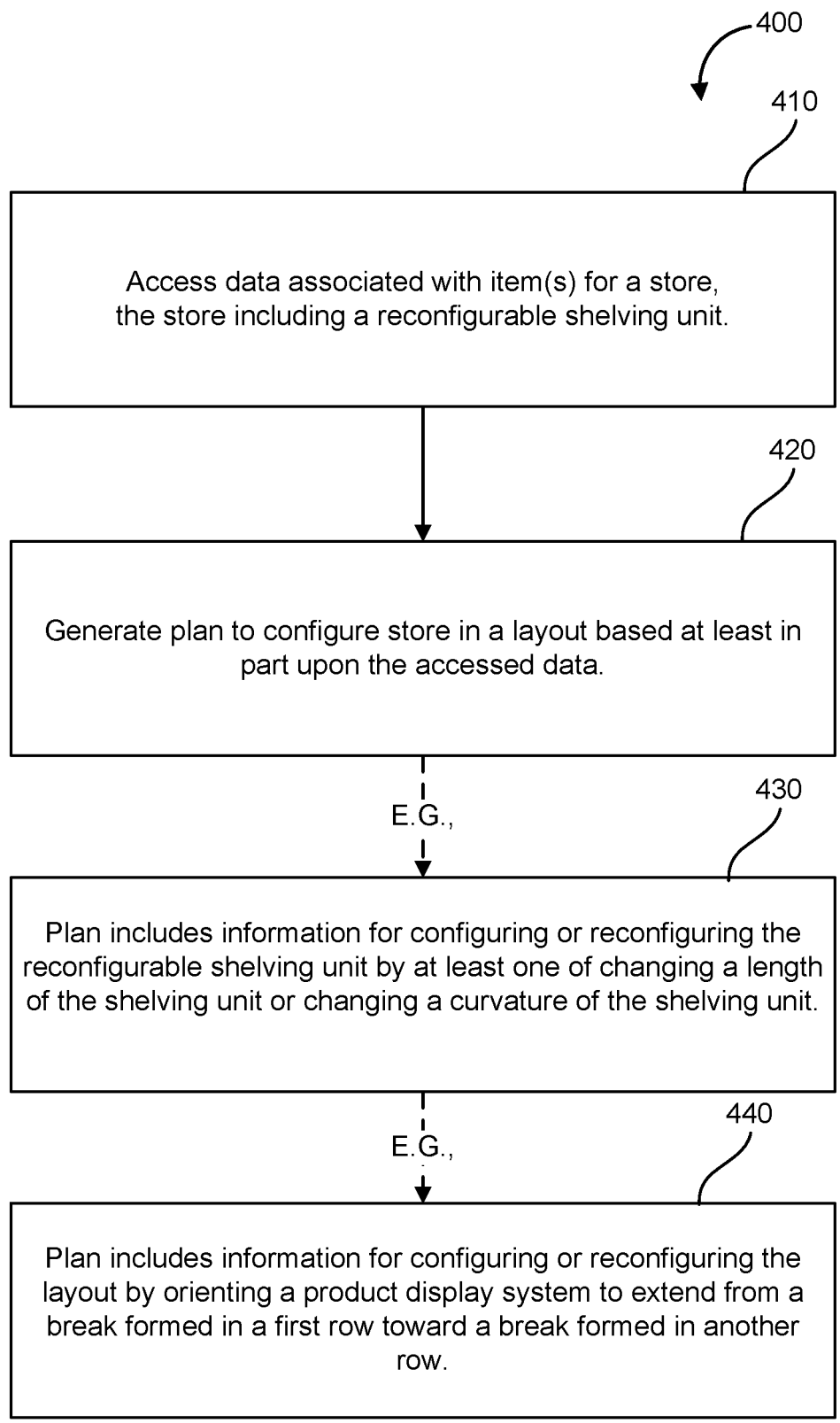
FIG. 4 is a flow chart representing another process of configuring a store in accordance with various embodiments.

FIG. 4 is a flowchart representing a process that can be executed, for example, by the computer system 300. At 410, the access module 302 may access data associated with item(s) for a store. In some embodiments, the data includes data about the item(s) that is based at least in part on information about customers of the store or persons identified as prospective customers of the store.

In embodiments, the store includes a reconfigurable shelving unit. For example, the reconfigurable shelving unit can include a plurality of components that are configured for re-arranging relative to one another between different configurations so as to change a footprint of the reconfigurable shelving unit by at least one of changing a length of the shelving unit or changing a curvature of the shelving unit. Use of such reconfigurable shelving units may provide increased flexibility for reconfiguring into desired shapes and/or sizes in comparison to other forms of shelving assemblies. Some examples of such reconfigurable shelving units are provided in the '675 application.

At 420, the plan module 304 may generate a plan to configure the store in a layout based at least in part upon the accessed data. In some scenarios, e.g., at 430, the plan may include information for configuring or reconfiguring the reconfigurable shelving unit by at least one of changing a length of the shelving unit or changing a curvature of the shelving unit. For example, this may include information about how to turn or otherwise move elliptical frames relative to one another to obtain a desired length and/or curvature of a shelving unit. As another example, data may indicate low volume sales of a particular item, such as pickles. The reconfigurable shelving unit for pickles can be pulled outward into a curve, so that a center portion protrudes partially into the aisle, allowing the pickles to be prominently displayed. Additionally or alternatively, data may indicate high lag times in parts of the store, and a shelving unit may be extended to allow more traffic around the high volume items. A shelving unit may also be curved to require a customer to walk past or through low volume items to high volume items, thus providing higher exposure for the low volume items. Data may indicate extremely low traffic or high traffic in some locations, and a shelving unit may be curved, straightened, lengthened, or shortened to fill or open space in the store to account for this data.

Additionally or alternatively, e.g., at 440, the plan may include information for configuring or reconfiguring a layout of the store by advantageously arranging aisles and rows of the store in accordance with the item data. For example, a product display system can be oriented to extend from a break formed in a first row toward a break formed in another row. Some examples of such layouts are provided in the '243 application, along with attendant benefits. Arranging product display systems in such a layout can increase an amount of space in which vendors or other promoters can better display and promote products. For example, such arrangements may increase a number of available end caps by introducing new end caps at breaks formed within rows, may introduce angled shelving units or other product display units (e.g., Center Caps) across an aisle to at least generally face customers as they enter the aisle, may provide openings or cells at angled intersections in which additional product or advertising may be displayed, may use angled shelving units to provide alcoves in which floor stacks of products or other focal point area displays can be placed without interfering with the customers' use of the aisles, or combinations thereof.

In some aspects, the store may additionally or alternatively include modular shelving systems. For example, the plan at 420 or 520 may additionally or alternatively include information about adding or removing sets of elliptical frames (such as in FIG. 37 of the '675 application) and/or mobile product displays (such as in the '243 application) to attain a desired layout.

In embodiments, the data accessed at 410 can be utilized to form the plan at 420 to advantageously arrange the rows, aisles, breaks, or other features of the store in accordance with the item information. As one example, data may indicate that a particular item, such as canned tomatoes, is expected to have a higher likelihood of purchase if seen by customers, for example, based on information that canned tomatoes are the base of a traditional dish prepared for an upcoming holiday celebrated by customers in the vicinity of the store. The layout may be adjusted to improve a visibility of the canned tomatoes within the aisles and rows of the store, such as by forming a break in a row that is across an aisle from the canned tomatoes and turning a product display system that holds the canned tomatoes display so that it is angled toward the break, e.g., bringing the tomatoes into a sightline of customers entering the aisle and maintaining paths of travel through the break across the aisle. Additionally or alternatively, data may indicate high lag times in parts of the store, and features of the layout (such as breaks in rows and/or orientations of product display systems) may be adjusted to allow more traffic around high volume items. Alcoves may be introduced, such as by angling product display units, and provide a high visibility floor display (or other space proximate the alcove) that may increase customer exposure to low volume items when en route to high volume items on the angled display units forming the alcove. Data may indicate that promotion funds are available for certain products, and a layout may be adjusted to account for this data, such as by adding, removing, or changing a number and/or orientation of end caps, breaks, or product display units to provide more favorable placement of the promoted products in the store.

Figure 5:
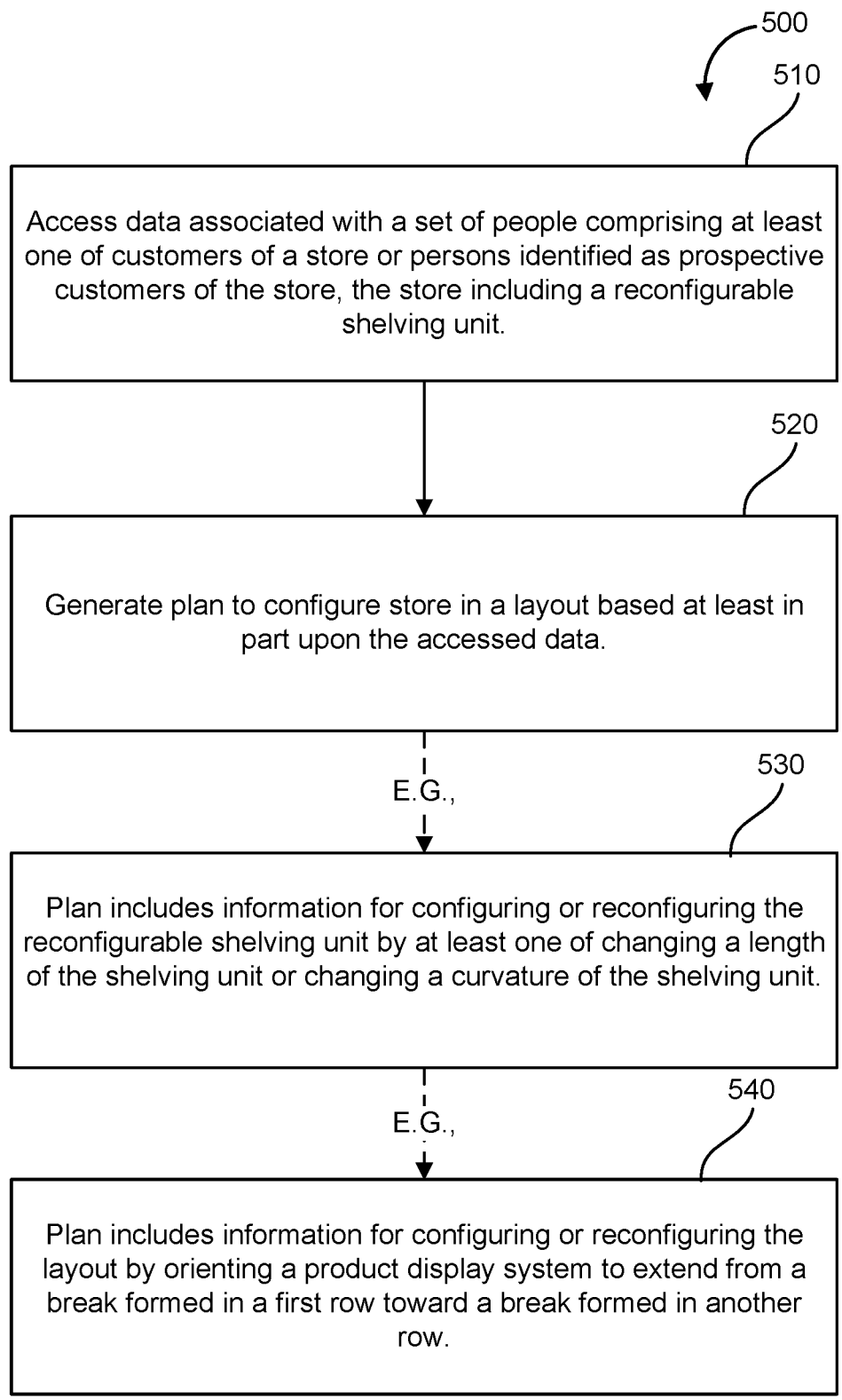
FIG. 5 is a flow chart representing an additional process of configuring a store in accordance with various embodiments.

FIG. 5 is a flowchart representing another process that can be executed, for example, by the computer system 300. At 510, the access module 302 may access data associated with a set of people comprising at least one of customers of a store or persons identified as prospective customers of the store. The store be a store that includes a reconfigurable shelving unit, as described above with respect to FIG. 4. The data may include data about item(s) for the store. At 520, the plan module 304 may generate a plan to configure the store in a layout based at least in part upon the accessed data. Illustrative examples are shown at 530 and 540, similar to the examples of 430 and 440 described above with respect to FIG. 4. For example, data at 510 may indicate a trend or preference from social media among individuals identified as customers or potential customers, and a shelving unit may be curved, straightened, lengthened, or shortened to fill or open space in the store in response to this data. In another example, data may indicate that a pool of relevant people are more or less likely to respond favorably to one layout in a store in comparison to another layout, and the layout in the store may be adjusted to account for this data, such as by adding, removing, or changing a number and/or orientation of end caps, breaks, product display units, or other features to bring the layout into conformity with the layout preferred by the pool of relevant people.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
   one or more processors; and
   a non-transitory computer-readable storage medium having stored therein instructions that, when executed by the one or more processors of the computer system, cause the computer system to at least:

acquire sensor data from at least one sensor in a facility, the facility comprising a plurality of shelving units, where at least one of the plurality of shelving units comprises a reconfigurable shelving unit;

generate a layout for the facility using the sensor data including reconfiguration information of the reconfigurable shelving unit; and send command signals representative of the reconfiguration information to at least one device for the reconfigurable shelving unit such that the reconfigurable shelving unit is reconfigured by the at least one device in response to receiving the command signals, wherein the reconfigurable shelving unit includes a variable planform shelving system.

2. The computer system of claim 1, wherein the variable planform shelving system includes a shelf having a variable planform, the shelf comprising:

a first frame having a first planform shape of at least a first portion of one end of a first ellipse and providing a first part of a variable support platform;

a second frame having a second planform shape of at least a second portion of one end of a second ellipse and providing a second part of the variable support platform; and a third frame having a third planform shape of a third ellipse.

3. The computer system of claim 2, wherein the first ellipse or the second ellipse has a perimeter continuously curving from a smallest diameter to a largest diameter that is larger than the smallest diameter.

4. The computer system of claim 3, wherein the third frame of the variable support platform is disposed between the first frame and the second frame, the third frame coupled with the first frame and the second frame so that relative positioning between the third frame and each of the first frame and the second frame is variable to vary a planform of the variable support platform.

5. The computer system of claim 4, wherein a second one of the first ellipse or the second ellipse has a second perimeter continuously curving from the smallest diameter to the largest diameter that is larger than the smallest diameter.

6. The computer system of claim 4, wherein at least one of the first frame and the second frame comprises a coupling pin coupled with the at least one of the first frame and the second frame for coupling the at least one of the first frame and the second frame with the third frame.

7. The computer system of claim 2, wherein at least one of the first frame and the second frame comprises a coupling pin coupled with the at least one of the first frame and the second frame for coupling the at least one of the first frame and the second frame with the third frame; and wherein the at least one of the first frame and the second frame further comprises a slot in the at least one of the first frame and the second frame that receives a portion of the third frame.

8. The computer system of claim 2, wherein the first frame or the second frame comprises:

a top plate having a fourth planform shape of one end of a fourth ellipse;

a bottom plate having a fifth planform shape of one end of a fifth ellipse and aligned relative to the top plate so that an outer perimeter of the bottom plate is aligned with an outer perimeter of the top plate.

9. The computer system of claim 8, further comprising a spacer between each of the top plate and the bottom plate, and space between the top plate and the bottom plate defines a slot for receiving the third frame.

10. The computer system of claim 1, wherein further instructions cause the computer system to generate an image of a virtual representation of the facility, such that the image is displayed.

11. The computer system of claim 1, wherein the sensor data is acquired from at least one type of sensor employed within the facility: cameras, shelving units sensors, proximity sensors, weight sensors, seismic sensors, wireless sensors, and RFID (radio-frequency identification) sensors.

12. A method for managing a variable planform shelving system, comprising:

acquiring sensor data from at least one sensor in a facility, the facility comprising a plurality of shelving units, where at least one of the plurality of shelving units comprises a reconfigurable shelving unit;

generating a layout for the facility using the sensor data including reconfiguration information of the reconfigurable shelving unit; and sending command signals representative of the reconfiguration information to at least one device for the reconfigurable shelving unit such that the reconfigurable shelving unit is reconfigured by the at least one device in response to receiving the command signals, wherein the reconfigurable shelving unit includes a variable planform shelving system.

13. The method of claim 12, wherein the variable planform shelving system further comprises:

a first frame having a first planform shape of at least a first portion of one end of a first ellipse and providing a first part of a variable support platform;

a second frame having a second planform shape of at least a second portion of one end of a second ellipse and providing a second part of the variable support platform; and a third frame having a third planform shape of a third ellipse.

14. The method of claim 13, wherein the first ellipse or the second ellipse has a perimeter continuously curving from a smallest diameter to a largest diameter that is larger than the smallest diameter.

15. The method of claim 14, wherein the third frame of the variable support platform is disposed between the first frame and the second frame, the third frame coupled with the first frame and the second frame so that relative positioning between the third frame and each of the first frame and the second frame is variable to vary a planform of the variable support platform.

16. The method of claim 15, wherein a second one of the first ellipse or the second ellipse has a second perimeter continuously curving from the smallest diameter to the largest diameter that is larger than the smallest diameter.

17. The method of claim 16, wherein at least one of the first frame and the second frame comprises a coupling pin coupled with the at least one of the first frame and the second frame for coupling the at least one of the first frame and the second frame with the third frame; and wherein the at least one of the first frame and the second frame further comprises a slot in the at least one of the first frame and the second frame that receives a portion of the third frame.

18. The method of claim 13, wherein the first frame or the second frame comprises:

a top plate having a fourth planform shape of one end of a fourth ellipse;

a bottom plate having a fifth planform shape of one end of a fifth ellipse and aligned relative to the top plate so that an outer perimeter of the bottom plate is aligned with an outer perimeter of the top plate.

19. The method of claim 13, further comprising generating an image of a virtual representation of the facility, such that the image is displayed.

20. The method of claim 12, wherein the sensor data is acquired from at least one type of sensor employed within the facility: cameras, shelving units sensors, proximity sensors, weight sensors, seismic sensors, wireless sensors, and RFID (radio-frequency identification) sensors.

* * * * *